(12) United States Patent
Cabrera et al.

(10) Patent No.: US 7,565,451 B2
(45) Date of Patent: Jul. 21, 2009

(54) ADAPTIVE DISPATCH OF RECEIVED MESSAGES TO CODE USING INTER-POSITIONED MESSAGE MODIFICATION

(75) Inventors: Luis Felipe Cabrera, Bellevue, WA (US); David A. Wortendyke, Seattle, WA (US); George P. Copeland, Redmond, WA (US); Erik B. Christensen, Seattle, WA (US); David E. Levin, Redmond, WA (US); Dhananjay M. Mahajan, Sammamish, WA (US); Scott Christopher Seely, Bellevue, WA (US); Daniel W. Roth, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 10/763,448

(22) Filed: Jan. 23, 2004

(65) Prior Publication Data
US 2005/0198390 A1    Sep. 8, 2005

(51) Int. Cl.
*G06F 15/16* (2006.01)
(52) U.S. Cl. .................. 709/246; 709/238; 709/245
(58) Field of Classification Search ............. 709/238, 709/245, 246
See application file for complete search history.

(56) References Cited
U.S. PATENT DOCUMENTS

| | | | |
|---|---|---|---|
| 5,557,798 A | 9/1996 | Skeen et al. ................. 395/650 |
| 2002/0138566 A1* | 9/2002 | Leach et al. ................. 709/203 |
| 2003/0014733 A1* | 1/2003 | Ringseth et al. ............. 717/116 |
| 2003/0074413 A1* | 4/2003 | Nielsen et al. .............. 709/206 |
| 2003/0188019 A1* | 10/2003 | Wesley ....................... 709/245 |
| 2003/0212587 A1* | 11/2003 | Jamison ....................... 705/8 |
| 2004/0087336 A1* | 5/2004 | Payrits et al. ................ 455/557 |
| 2004/0088433 A1* | 5/2004 | Kaler et al. .................. 709/246 |
| 2004/0215824 A1* | 10/2004 | Payrits ....................... 709/245 |

OTHER PUBLICATIONS

Mani, Anbazhagan; Nagarajan, Arun; "Use SOAP-based intermediaries to build chains of Web service functionality" Sep. 1, 2002 <http://www.ibm.com/developerworks/webservices/library/ws-soapbase/>.*

(Continued)

*Primary Examiner*—Dohm Chankong
*Assistant Examiner*—Thomas J Dailey
(74) *Attorney, Agent, or Firm*—Workman Nydegger

(57) ABSTRACT

Mechanisms in which upon receiving a message, the message is passed through one or more receiving path components that are positioned in the receiving path of the message prior to being passed to a dispatching component. One or more of the receiving path components may modify the message to include information that may be helpful to the dispatching component in order to perform the dispatch. The dispatching component receives modified message, and uses information from the modified message (including potentially the modification itself) to perform the dispatch. Since the message is modified to include additional information helpful to the dispatching component, the dispatching component may be more flexible in identifying the processing that should occur with the message. Accordingly, specialized and flexible processing may be enabled that is ideally suited for the message.

30 Claims, 3 Drawing Sheets

OTHER PUBLICATIONS

Graham, Steve; Boubez, Toufic; Daniels, Glen; Davis, Doug; Nakamura, Yuichi; Neyama, Ryo; and Simeonov, Simeon. "Building Web Services with Java: SOAP" May 10, 2002, <http://www.informit.com/articles/article.aspx?p=26666&seqNum=8>.*

Mitra, Nilo; "SOAP Version 1.2 Part 0: Primer" May 7, 2003, W3C, <http://www.w3.org/TR/2003/PR-soap12-part0-20030507/>; Whole document.*

"*Lecture 19, Web Service Intermediaries, WS-Routing and WS-Referral*," Web Services Architecture and Programming, V22.0480-004, online, Nov. 24, 2003, pp. 1-15(PDF enclosed entitled "Article 1," 4 pgs.).

Felber et al., "*Scalable Filtering of XML Data for Web Services*," IEEE Internet Computing, Jan./Feb. 2003, pp. 49-57 (PDF enclosed entitled "Article 2," 9 pgs.).

Sahai et al., "*Message Tracking in SOAP-Based Web Services*," Hewlett-Packard Laboratories, Palo Alto, CA, 14 pgs (PDF enclosed entitled "Article 3," 14 pgs.).

Efficient Message Dispatch in Object-Oriented Systems Mayur Naik and Rejeev Kumar Mar. 2000 p. 49-58 ACM SIGPLAN.

Cybernetics and System—Towards a Unified Messaging Environment Over the Internet Leonard Chong, Siu Cheung Hui and Chai Kiat Yeo 1999 p. 533-549.

ECOOP ' 95 Object-Oriented Programming Message Dispatch on Pipelined Processors Karel Driesen, Urs Holzle and Jan Vitek 1995 p. 252-282.

New York University, Computer Science: "Lecture 19, Web Service Intermediaries, WS-Routing and WS-Referral" V22. 0480-004: Web Services Architecture and Programming, Online! Nov. 24, 2003, pp. 1-5.

Felber, Pascal, et al. "Scalable Filtering of XML Data for Web Services" IEEE Internet Computing, Online! Feb. 2003, pp. 49-57.

Sahai, A., et al. "Institute of Electrical and Electronics Engineers: Message Tracking in Soap-Based Web Services" 2002 IEEE/IFIP Network Operations and Management Symposium, Florence, Italy, Apr. 15-19, 2002, New York, NY Apr. 15, 2003, pp. 33-47.

* cited by examiner

ADAPTIVE DISPATCH OF RECEIVED MESSAGES TO CODE USING INTER-POSITIONED MESSAGE MODIFICATION

BACKGROUND OF THE INVENTION

1. The Field of the Invention

The present invention relates to computing technology; and more specifically, to mechanisms for dispatching received messages to code in a dynamic manner using inter-positioned message modification prior to dispatch.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

Software can be quite complex, often being compiled or interpreted from many thousands or even millions of lines of source code. In order to provide some organization to the software development process, the task may be broken up into manageable subroutines or methods that perform more specific actions. The methods are then interrelated to perform the more complex functionality of the software as a whole. In message processing systems, received message are dispatched by the dispatching mechanism for processing by one or more of these methods depending on the surrounding relevant facts that are accessible to the dispatching mechanism.

In order to perform dispatching that is most appropriate, it would be advantageous for the dispatching component to have access to as much relevant information as possible. However, not all components in a system have equal access to information. For example, the dispatch mechanism may not have direct information regarding the connection over which the message was received, the protocol used to deliver the message, the history of message exchange, the current load balancing state, the time the message was received, the importance of the sender of the message, and the like. Furthermore, relevant information may not be present in the message itself, or at least is not easily accessible from the message.

Accordingly, what would be advantageous are mechanisms for allowing the dispatching mechanism to more easily factor in previously unknown or difficult to access information when performing dispatch of the message to allow more flexibility in appropriately processing a message.

BRIEF SUMMARY OF THE INVENTION

The foregoing problems with the prior state of the art are overcome by the principles of the present invention, which may be implemented in a network environment that includes a receiving computing system capable of receiving messages from other computing systems in the network environment. The receiving computing system includes a dispatching component that dispatches received message to groups of one or more methods for further processing. The principles of the present invention related to mechanisms in which the dispatching component dispatches a received message even though the dispatch mechanism may not have direct access to some information relevant for the dispatch, and even though that information is not present or is not easily obtained from the message as received by the receiving computing system.

Upon receiving a message, the message is passed through one or more receiving path components that are positioned in the receiving path of the message prior to being passed to the dispatching component. One or more of the receiving path components may modify the message to include information that may be helpful to the dispatching component in order to perform the dispatch. Such information may include, for example, the connection over which the message was received, the protocol type used to receive the message, the time that the message was received, a handling priority of the message, a status of a sender of the message, a load of the computing system, or any other information helpful to the dispatch. The dispatching component receives a modified message, and uses information from the modified message (including potentially the modification itself) to perform the dispatch.

Since the message is modified to include additional information helpful to the dispatching component, the dispatching component may be more flexible in identifying the processing that should occur with the message. Accordingly, specialized and flexible processing may be enabled that is ideally suited for the message. For example, if the sender was a high volume customer, the message may be specially processed by different code than if the sender was a low volume customer. In this case, a component in the receiving path that has access to a customer database may add the appropriate customer status to the message so that the message may be appropriately dispatched by the dispatching component.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
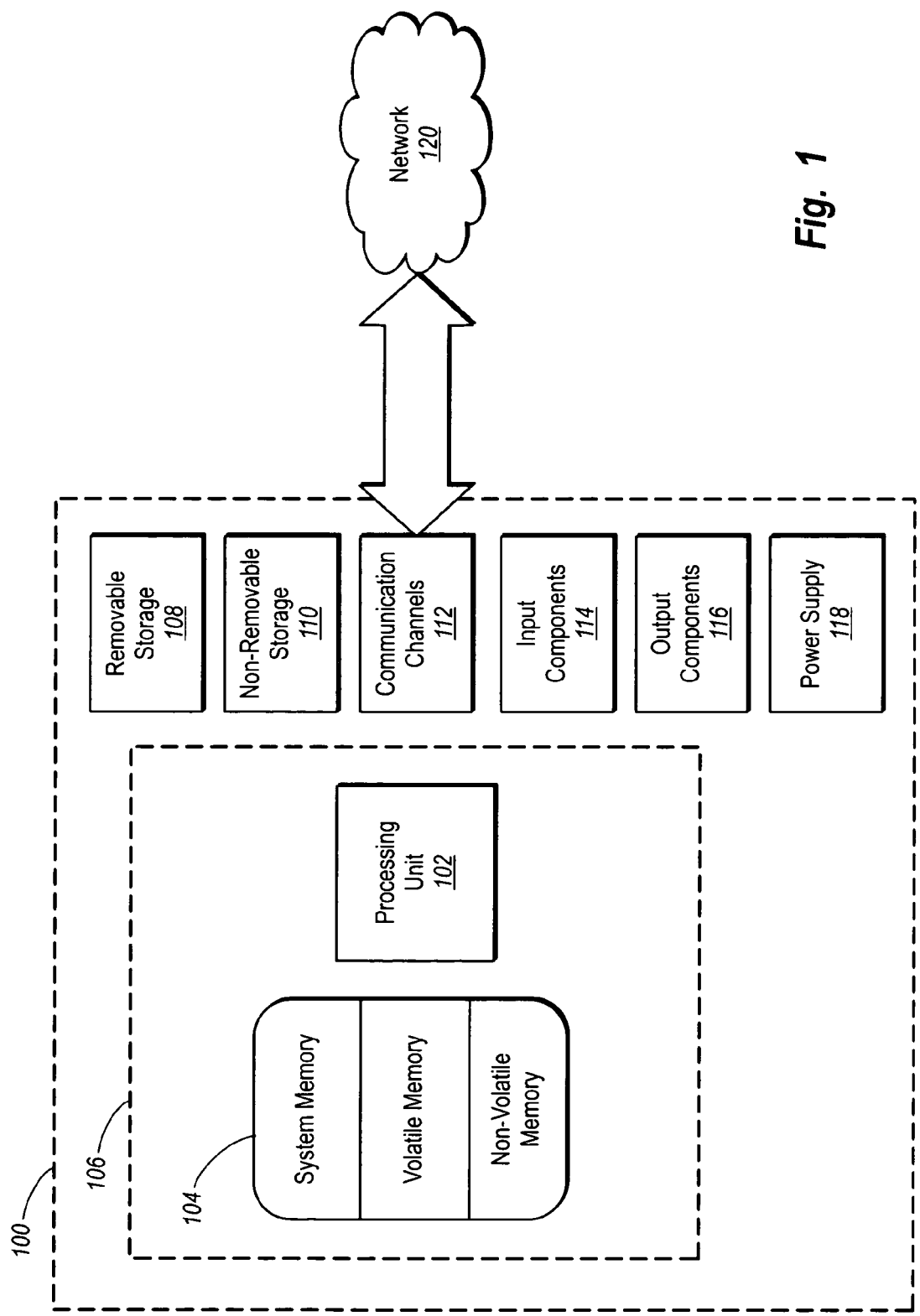
FIG. 1 illustrates a suitable computing system that may implement features of the present invention.

The principles of the present invention relate to mechanisms in which upon receiving a message, the message is passed through one or more receiving path components that are positioned in the receiving path prior to being passed to a dispatching component. One or more of the receiving path components may modify the message to include information that may be helpful to the dispatching component in order to perform the dispatch. The dispatching component receives modified message, and uses information from the modified message (including potentially the modification itself) to perform the dispatch. Since the message is modified to include additional information helpful to the dispatching component, the dispatching component may be more flexible in identifying the processing that should occur with the message. Accordingly, specialized and flexible processing may be enabled that is ideally suited for the message.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware. FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over a network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
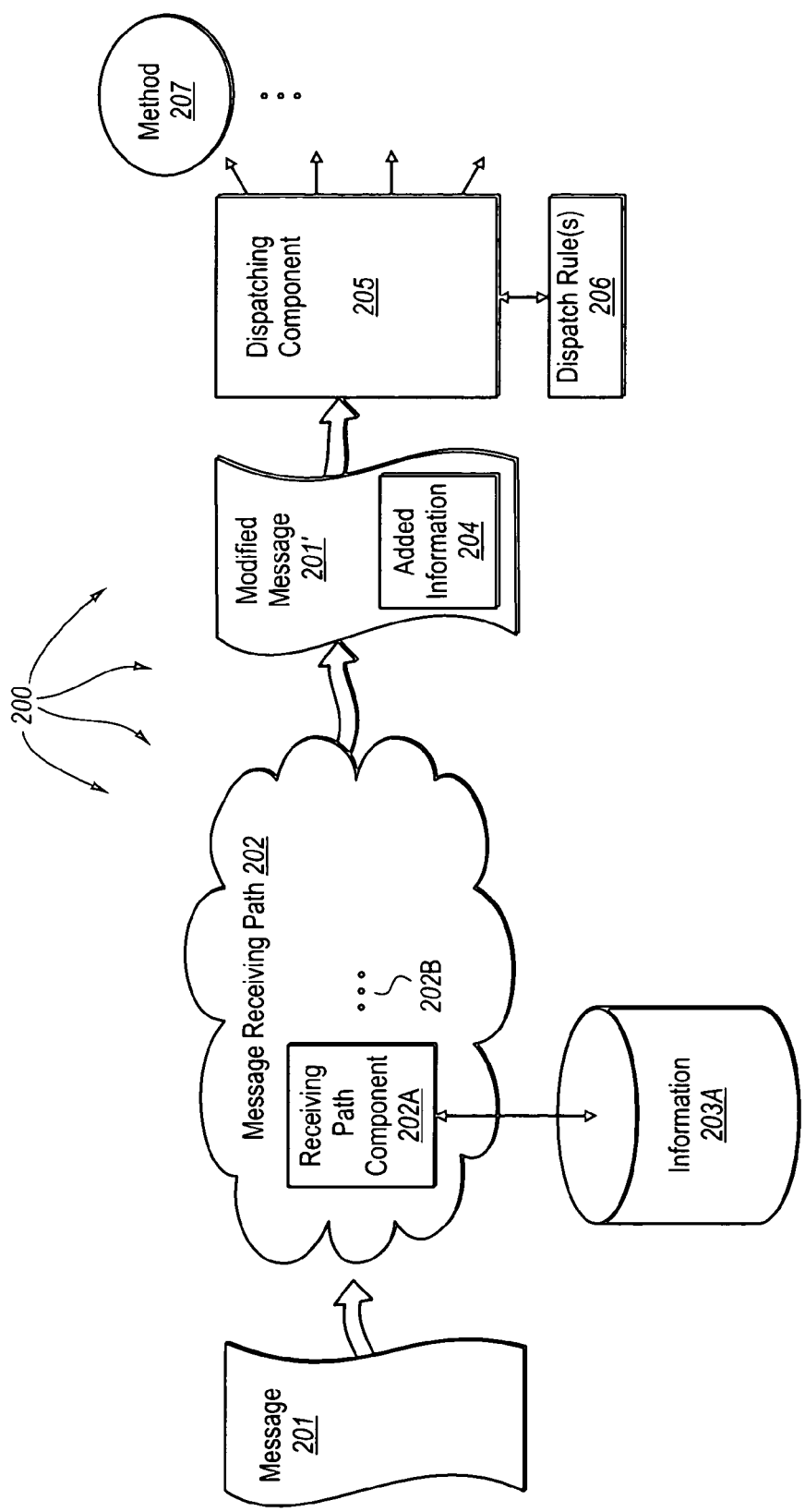
FIG. 2 illustrates various components that may cooperatively interact to perform flexible dispatch of received messages in accordance with the principles of the present invention.

FIG. 2 illustrates various components 200 that may cooperatively interact to perform flexible dispatch of received messages in accordance with the principles of the present invention. When implemented in the context of the computing system 100 of FIG. 1, the various components may be instantiated in memory 104 and/or be persisted in persistent memory such as, for example, removable storage 108 and/or non-removable storage 110. The persistent memory may be, for example, a magnetic disk.

A message 201 is received in a message receiving path 202 that includes one or more receiving path components. For instance, message receiving path 202 is illustrated as including receiving path component 202A amongst potentially others as represented by the horizontal ellipses 202B. The receiving path components may be, for example, a connection layer, a decryption layer, an access control layer, an environment analysis layer, a connection manager, an application program, or any other component that has access to the message 201 prior to the message being provided to a dispatching component 205. The various receiving path components may be implemented in the memory of the computing system 100 of FIG. 1, for example.

At least one of the receiving path components is configured to modify the message with at least one modification. The modified message is illustrated as modified message 201' in FIG. 2 with the additional information represented by the modification represented by added information 204. The modification may include for example, the addition of one or more data fields, the deletion of one or more data fields and/or the modification of one or more data fields. For example, if the message 201 were a Simple Object Access Protocol (SOAP) envelope, the added information 204 may be added, deleted, or modified SOAP header(s), although modification of data fields in the body of the message 201 is not precluded by the principles of the present invention. This information represents any new information that may be learned or obtained by the modification. For example, the dispatching code may be interested only in whether or not a modification was made, not what that modification was.

The dispatching component 205 receives the modified message 201' and uses the dispatch rules 206 and information from the modified message 201' (including potentially the added information 204') to identify which group of one or more methods to send the message to. In the illustrated example, the modified message 201' may be sent to, for example, method 207 for further processing. The receiving path components may have access to information that is not easily accessible or accessible at all by the dispatching component 205. For example, information 203A accessible by the receiving patch component 202A may not be accessible by the modified message 201'. Accordingly, by allowing the receiving path components to add information to the message 201, the dispatching component 205 may use information that it would not normally be able to easily access (or access at all) to make a more intelligent decision on where to dispatch the message 201'.

Figure 3:
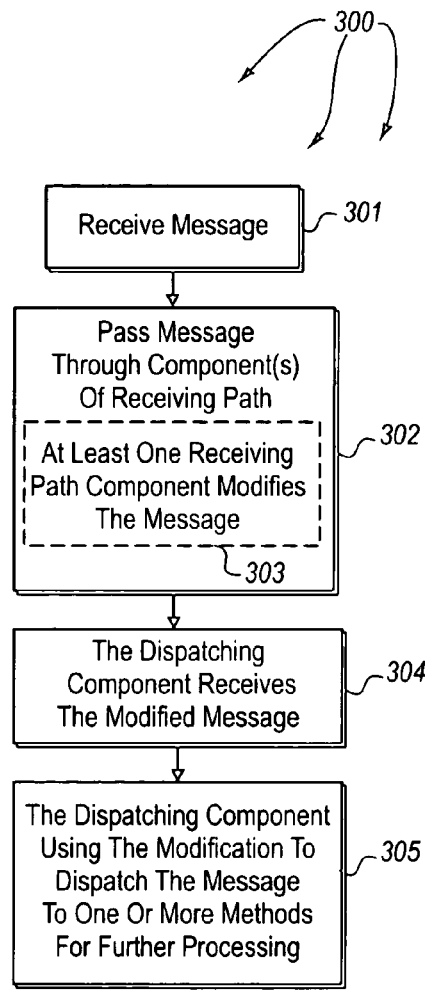
FIG. 3 illustrates a flowchart of method for the computing system to perform flexible dispatch of received message in accordance with the principles of the present invention.

FIG. 3 illustrates a flowchart of a method 300 for dispatching mechanism to dispatch a received message even though the dispatch mechanism may not have direct access to some information relevant for the dispatch, and even though that information is not present or is not easily obtained from the message as received by the receiving computing system. First, the message is received (act 301). Then the message is passed through the one or more receiving path components that are positioned in the receiving path of the message prior to being passed to the dispatching component (act 302). As this is happening, at least one of the receiving path component (s) modifies the message with at least one modification (act 303). This modification may be performed by one or more than one of the receiving path components such as for example, a connection layer, a decryption layer, an access control layer, an environment analysis layer, a connection manager, an application program, or any other component in the path of the message prior to being received by the dispatching component. The dispatching component receives the modification of the message (act 304) in conjunction with potentially other information in the message to evaluate the list of dispatch rules to determine where to dispatch the modified message to (act 305).

Figure 4:
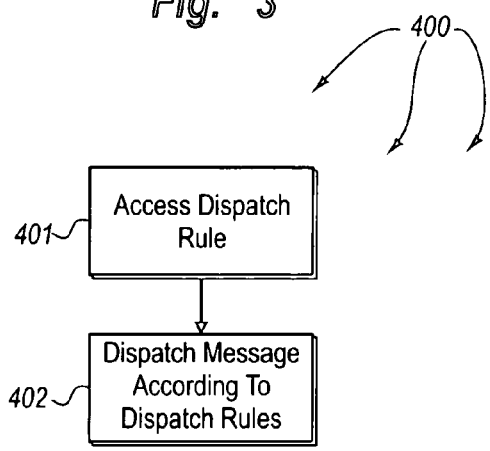
FIG. 4 illustrates a flowchart of a method for dispatching using the modified message.

FIG. 4 illustrates a flowchart of a method 400 for dispatching using the modified message. First, the dispatching component accesses a dispatch rule that references information present in the modification to the message (act 401). Then, the dispatching component dispatches the message according to the dispatch rule. In one embodiment, the message may be a hierarchically structured document. In that case, the dispatch rule may be expressed using an XPATH statement although this is not required.

The added information 204 may be, for example, a connection identification identifying a connection that the message was received over. This would allow the dispatching mechanism to dispatch the message to the appropriate code instance that corresponds to that instance.

Alternatively, the added information may be, for example, a protocol type used to receive the message. This would aid in dispatching to code appropriate for that protocol. For example, certain code may be adapted to validate messages that allege to conform to a particular protocol.

The added information may include a time that the message was received. Perhaps there is certain processing performed on a message if received during non-working hours, as compared during working hours. In this case, the dispatching mechanism may dispatch to the appropriate code given the time of receipt.

The added information may include a handling priority. For example, messages that represent an order for large quantities of goods, and messages from new customers may be determined to be high priority. One of the receiving path components may have access to a customer database that allows for the handling priority to be identified. Accordingly, the dispatching component may dispatch the message to the appropriate code given the handling priority even though the handling priority was not specified in the message itself as received.

The added information may also include information related to the status of the sender. For example, frequent customers may have a certain status identifier, new customers may have another status identifier, and low volume customers may have yet another. This information may be added to the message to allow appropriate dispatch given the status of the message sender.

The added information may also include the current workload of the computing system. It may be appropriate to send the message to a piece of code that is less loaded.

These represent examples of the type of added information that may be useful in dispatching the message. They are by no means intended to be an exhaustive listing. Those skilled in the art will recognize (after having reviewed this description), that the principles of the present invention allow for any variety of information to be added to a message while in the receiving path. Accordingly, this wide variety of information may be used to more flexibly and appropriately dispatch messages.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network environment that includes a receiving computing system capable of receiving messages including Simple Object Access Protocol (SOAP) envelopes from other computing systems in the network environment, the receiving computing system including a dispatching mechanism that dispatches a received message to groups of one or more methods for further processing, a method for the dispatching mechanism to dispatch a received message without having direct access to at least a portion of information relevant for the dispatch, the information not being included in the message as received by the receiving computing system, the method comprising the following:

an act of receiving a message including a Simple Object Access Protocol (SOAP) envelope at the receiving computing system;

an act of passing the received message through one or more receiving path components that are positioned in the receiving path of the message prior to being passed to the dispatching mechanism, the passing of the received message to the dispatching mechanism occurring within the receiving computing system, each of the receiving path components in the receiving path being components of the receiving computing system;

an act of at least one of the one or more receiving path components modifying the message with at least one modification, the modification including adding a SOAP header with additional information not included in the received message, that is relevant to the dispatch of the message, the information being used by the dispatching mechanism to dynamically dispatch the message;

an act of the dispatching mechanism receiving the modified message from the receiving path within the receiving computing system;

an act of the dispatching mechanism evaluating the added information and accessing a dispatch rule that references the added information relevant to the dispatch of the message and the dispatch rule to determine an appropriate group of message processing methods based on both the added information to the modified message and the dispatch rule; and based on the information obtained in the modification, an act of the dispatching mechanism using the obtained information and the dispatch rule to dynamically dispatch the message to the group of appropriate message processing methods within the receiving computing system for further processing, the dispatching comprising transferring the modified received message to the group of message processing methods within the receiving computing system for further specialized message content processing based on the type of information included in the modification.

2. The method in accordance with claim 1, wherein the act of at least one of the one or more receiving path components modifying the messages comprises the following:

an act of adding at least one data field to the message.

3. The method in accordance with claim 1, wherein the act of at least one of the one or more receiving path components modifying the messages comprises the following:

an act of modifying at least one data field in the message.

4. The method in accordance with claim 1, wherein the act of at least one of the one or more receiving path components modifying the messages comprises the following:

an act of deleting at least one data field from the message.

5. The method in accordance with claim 1, wherein the act of at least one of the one or more receiving path components modifying the message comprises the following:

an act of a receiving component modifying the message.

6. The method in accordance with claim 1, wherein the act of at least one of the one or more receiving path components modifying the message comprises the following:

an act of a receiving path component other than the receiving component modifying the message.

7. The method in accordance with claim 1, wherein the act of at least one of the one or more receiving path components modifying the message comprises the following:

an act of a single receiving path component modifying the message.

8. The method in accordance with claim 1, wherein the act of at least one of the one or more receiving patch components modifying the message comprises the following:

an act of a plurality of receiving path components modifying the message.

9. The method in accordance with claim 1, wherein the at least one modification includes a connection identification identifying a connection that the message was received over.

10. The method in accordance with claim 1, wherein the at least one modification includes a protocol type used to receive the message.

11. The method in accordance with claim 1, wherein the at least one modification includes a time that the message was received.

12. The method in accordance with claim 1, wherein the at least one modification includes information related to a handling priority of the message.

13. The method in accordance with claim 1, wherein the at least one modification includes information related to a status of a sender of the message.

14. The method in accordance with claim 1, wherein the at least one modification includes information related to load of the computing system.

15. The method in accordance with claim 1, wherein the dispatch rule is expressed using one or more XPATH statements.

16. A computer program product for use in a network environment that includes a receiving computing system capable of receiving messages including Simple Object Access Protocol (SOAP) envelopes from other computing systems in the network environment, the receiving computing system including a dispatching mechanism that dispatches a received message to groups of one or more methods for further processing, the computer program product for performing a method for the dispatching mechanism to dispatch a received message without having direct access to at least a portion of information relevant for the dispatch, the information not being included in the message as received by the receiving computing system, the computer program product comprising one or more recordable-type computer-readable media having thereon computer-executable instructions that, when executed by one or more processors of the computing system, cause the computing system to perform the following:

an act of accessing a received message including a Simple Object Access Protocol (SOAP) envelope, the message being received at the receiving computing system;

an act of providing the received message through one or more receiving path components that are positioned in the receiving path of the message prior to being passed to the dispatching mechanism, the providing of the received message to the dispatching mechanism occurring within the receiving computing system, each of the receiving path components in the receiving path being components of the receiving computing system;

an act of a receiving path component modifying the received message with at least one modification, the modification including adding a SOAP header with additional information that is not included in the received message, that is relevant to the dispatch of the message, the information being used by the dispatching mechanism to dynamically dispatch the message;

an act of the dispatching mechanism evaluating the added information and accessing a dispatch rule that references the added information relevant to the dispatch of the message and the dispatch rule to determine an appropriate group of message processing methods based on both the added information to the modified message and the dispatch rule; and based on the information obtained in the modification, an act of the dispatching mechanism using the obtained information and the dispatch rule to dynamically dispatch the message to the group of appropriate message processing methods within the receiving computing system for further processing, the dispatching comprising transferring the modified received message to the group of message processing methods within the receiving computing system for further specialized message content processing based on the type of information included in the modification.

17. The computer program product in accordance with claim 16, wherein the at least one modification includes a connection identification identifying a connection that the message was received over.

18. The computer program product in accordance with claim 16, wherein the at least one modification includes a protocol type used to receive the message.

19. The computer program product in accordance with claim 16, wherein the at least one modification includes a time that the message was received.

20. The computer program product in accordance with claim 16, wherein the at least one modification includes information related to a handling priority of the message.

21. A computing system capable of receiving messages including Simple Object Access Protocol (SOAP) envelopes from other computing systems in the network environment comprising the following:

one or more processors;

system memory;

a dispatch mechanism that dispatches a received message to groups of one or more methods for further processing;

one or more computer-readable media having thereon computer-executable instructions that, when executed by the one or more processors, causes the computing system to perform the following:

an act of receiving a message including a Simple Object Access Protocol (SOAP) envelope at the computing system;

an act of passing the received message through one or more receiving path components that are positioned in the receiving path of the message prior to being passed to the dispatching mechanism, the passing of the received message to the dispatching mechanism occurring within the computing system, each of the receiving path components in the receiving path being components of the computing system;

an act of at least one of the one or more receiving path components modifying the message with at least one modification, the modification including adding a SOAP header with additional information not included in the received message, that is relevant to the dispatch of the message, the information being used by the dispatching mechanism to dynamically dispatch the message;

an act of the dispatching mechanism receiving the modified message from the receiving path within the computing system;

an act of the dispatching mechanism evaluating the added information and accessing a dispatch rule that references the added information relevant to the dispatch of the message and the dispatch rule to determine an appropriate group of message processing methods based on both the added information to the modified message and the dispatch rule; and based on the information obtained in the modification, an act of the dispatching mechanism using the obtained information and the dispatch rule to dynamically dispatch the message to the group of appropriate message processing methods within the receiving computing system for further processing, the dispatching comprising transferring the modified received message to the group of message processing methods within the receiving computing system for further specialized message content processing based on the type of information included in the modification.

22. The method of claim 1, further comprising an act of selecting an appropriate method from the group of methods, wherein the selection is based on the type of information included in the modification.

23. The method of claim 22, wherein each type of information included in the modification is a factor in determining which method to select.

24. The method of claim 10, wherein the message is dispatched to a method appropriate for the protocol.

25. The method of claim 1, wherein the body of the received message is modified to include information not included in the received message.

26. The method of claim 1, wherein the added information includes at least two of the following: the connection over which the message was received, the protocol type used to receive the message, the time that the message was received, a handling priority of the message, a status of a sender of the message and a current processing load of the receiving computing system.

27. The method of claim 1, wherein modifying the message includes deleting at least a portion of information from the message, such that the dispatching of the message is affected by the deletion.

28. The method of claim 1, wherein modifying the message includes overwriting at least a portion of information in the message with another portion of information, such that the dispatching of the message is affected by the modification.

29. The method of claim 1, further comprising:

the dispatching mechanism determining that a modification was made to the message; and based on the determination that a modification was made, and regardless of which modification was made, dispatching the message as a result of determining that a modification was made.

30. The method of claim 1, wherein modifying the message includes at least two of adding information, deleting information, and overwriting information, such that the dispatching of the message is affected by the modification.

* * * * *